March 27, 1951 R. W. KURTZ 2,546,192
IMPLEMENT CONTROL HITCH AND ASSOCIATED MECHANISM
Filed Oct. 7, 1949 3 Sheets-Sheet 1
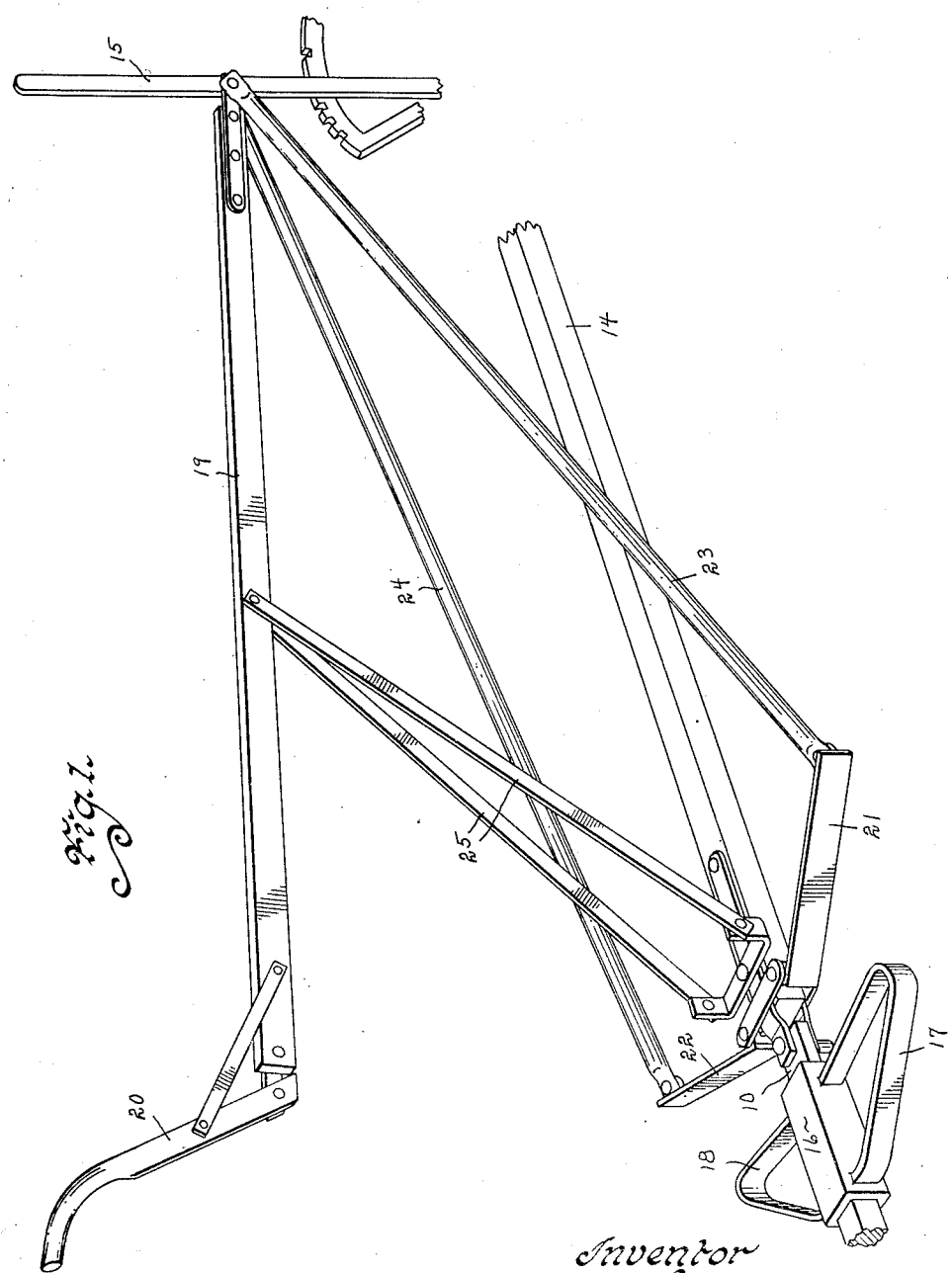

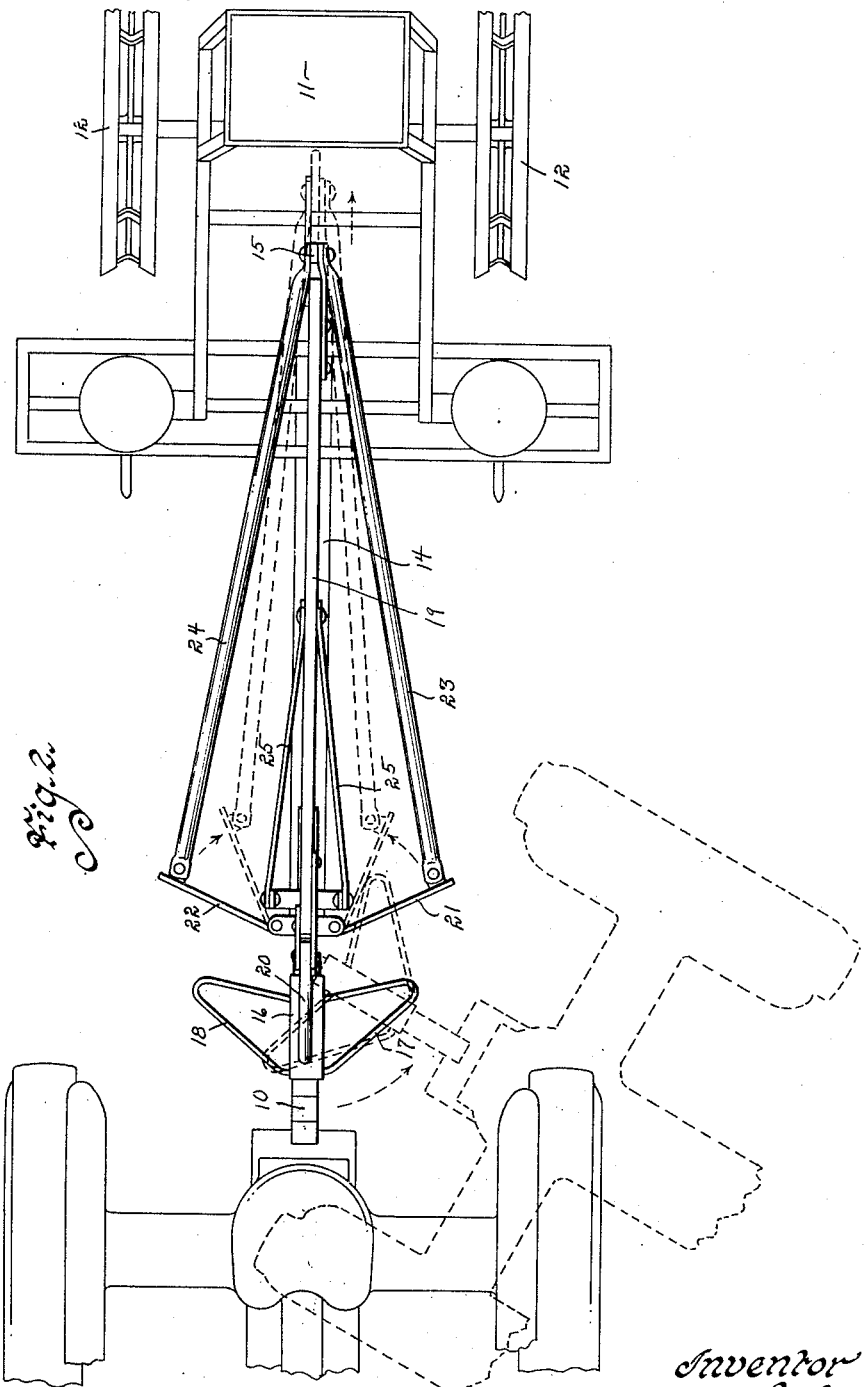

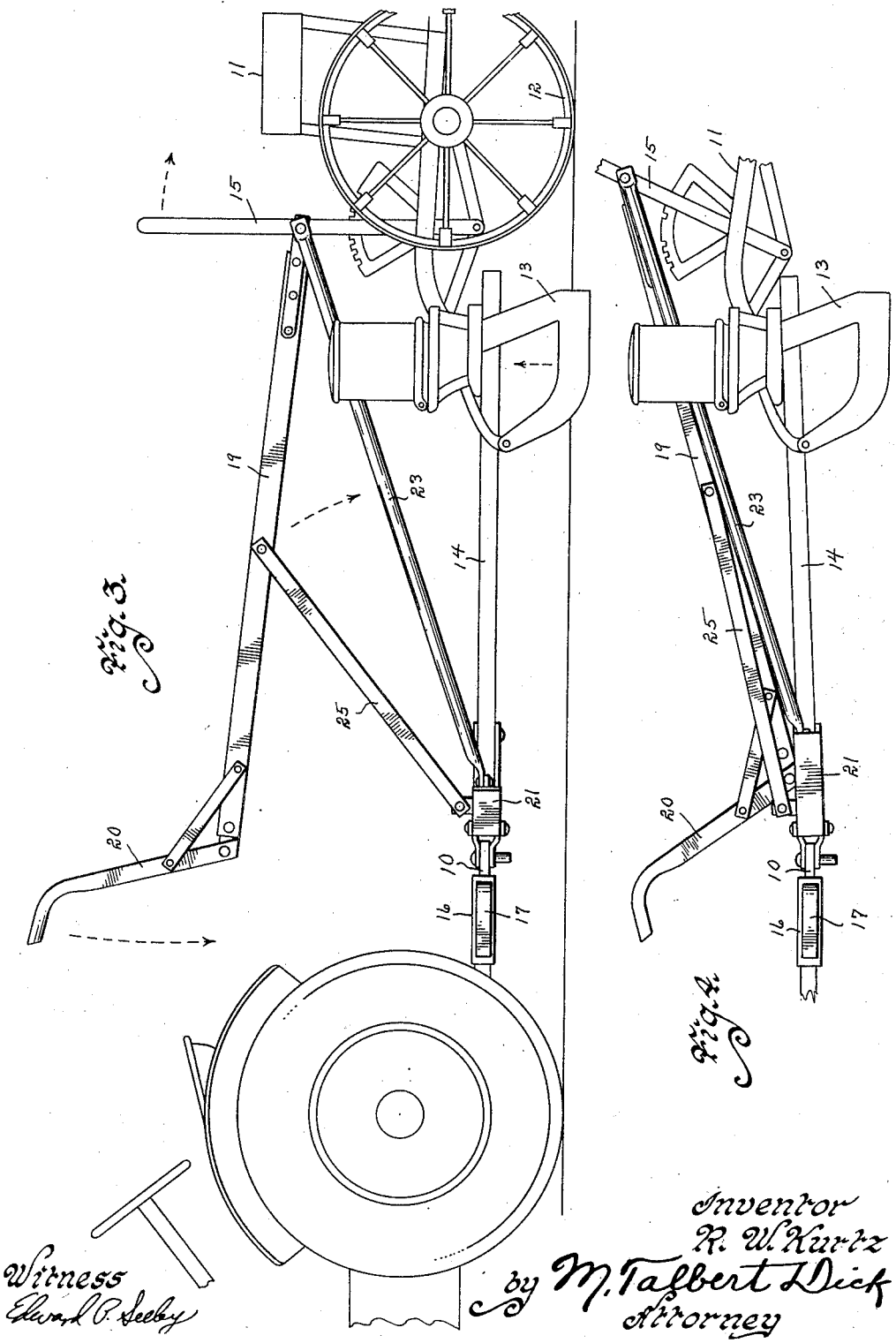

Patented Mar. 27, 1951

2,546,192

UNITED STATES PATENT OFFICE 2,546,192

IMPLEMENT CONTROL HITCH AND ASSOCIATED MECHANISM

Raymond W. Kurtz, Greenfield, Iowa, assignor of one-half to Harvey C. Paull, Adair County, Iowa Application October 7, 1949, Serial No. 120,089

3 Claims. (Cl. 97—47)

1

This invention relates to any automatic control hitch between a farm tractor and an implement and more specifically to a connecting and actuating means between a tractor and a corn planter wherein the corn planter is not only attached to the tractor, but will be automatically raised and its planting mechanism disconnected when turning around at the end of a planting row.

The drawing of a corn planter or like back of a tractor is old. The difficulty is, however, that when the end of the planting row is reached, it is necessary to elevate the planting mechanism from the ground and disconnect the same from the traction wheels. All such corn planters are capable of being raised by a hand lever which operation also disconnects the corn dropping mechanism. After the turn has been accomplished, the lever must again be actuated to lower the planter and place it again in gear with its traction wheels. This manual operation of the planter by the tractor operator is indeed tedious and difficult as well as time consuming.

Therefore the principal object of my invention is to provide an automatic means that will raise the planter at the end of the planting row and after the turn has been made will lower it again into planting position.

A still further object of this invention is to provide a vehicle hitch control that is economical in manufacture and durable in use.

A still further object of my invention is to provide a hitch of the class described that is easily and quickly installed.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a perspective view of the device per se.

Fig. 2 is a top plan view of the device installed between and to the tractor and corn planter.

Fig. 3 is a side view of the installed device and more fully illustrates its construction.

Fig. 4 is a side view of the installed device with the corn planter in elevated condition.

Referring to the drawings, I have designated the draw bar of the tractor by the numeral 10. The numeral 11 generally designates an ordinary corn planter having the usual wheels 12, corn planting shoes 13, tongue 14 and lever 15 for

2 lowering and raising the planting shoes and placing the operating mechanism into and out of gear. The end of the tongue 14 is horizontally hingedly connected to the tractor draw bar 10 by the usual clevis means. It is to such equipment that I apply my device and which I will now describe in detail.

The numeral 16 designates a sleeve fixed around the draw bar just forward of its connection with the planter tongue. Extending laterally to each side of this sleeve is a horizontal wing frame or projection designated by the numerals 17 and 18 respectively. The numeral 19 designates the manual control bar having its rear end pivotally secured to the lever 15 and its length extending to near the seating area of the tractor, as shown in Fig. 3. The numeral 20 designates a handle bar secured to the free end of the bar 19. The numeral 21 designates a horizontal bar having its inner end horizontally pivoted to the forward end portion of the planter tongue. This bar extends rearwardly and to the left and is in the same horizontal plane and to the rear of the wing frame 17. The numeral 22 designates a similar horizontal bar having its inner end horizontally pivoted to the forward end portion of the planter tongue, but extending to the right and rearwardly therefrom. This bar 22 is in the same horizontal plane and to the rear of the wing frame 18 as shown in Fig. 1.

The numeral 23 designates an elongated link having its forward end horizontally pivoted to the outer end of the bar 21 and its other end attached to the lever 15. The numeral 24 designates a similar elongated link having its forward end horizontally pivoted to the outer end of the bar 22 and its other end attached to the lever 15. By this arrangement whenever either of the automatic control bars 21 or 22 are forced rearwardly, the links or either of them will move the planter lever 15 rearwardly, thereby raising the planting shoes and disconnecting the planting mechanism. The numeral 25 designates two elongated link bars having their rear upper ends vertically pivoted to the center portion of the bar 19, and their forward lower ends vertically pivoted to the forward end portion of the planter tongue. These links extend forwardly and downwardly. By using two links they may be spaced apart at their lower ends, as shown in Fig. 1, so that the manually controlled bar will not have undesirable lateral movement.

The practical operation of my device is as follows:

When the tractor comes to the end of the planting row and turns to the left the wing 17 will engage the bar 21, thereby forcing the link 23 rearwardly and thereby moving the lever 15 rearwardly. This action will automatically raise the planting shoes and disconnect the planting mechanism. As soon as the turn has been completed and the wing 17 is in forward position relative to the longitudinal axis of the planter, the weight of the planting mechanism will exert itself to move the lever and link forwardly, thereby automatically lowering the planting shoes and placing the planting mechanism in gear again. The operation of the device is shown by dotted lines in Fig. 2. If the tractor turns to the right, the wing 18 will contact the bar 22 with the same automatic result.

There are times when it is desired to maintain the planter in raised condition such as when going to or coming from the field. In such cases, the same is accomplished by manually moving the hand control 19 and 20 downwardly to a point below its pivot axis relative to the links 25. This action also moves the lever 15 to the rear, and will maintain the lever in such position until the handle 20 is manually elevated. While this manual control also moves upwardly and downwardly with the automatic means, the automatic means does not move it to such a lowered position that it locks.

Some changes may be made in the construction and arrangement of my implement control hitch and associated mechanism without departing from the real spirit and purpose of my invention, and it is my intention to cover by my claims, any modified forms of structure or use of mechanical equivalents which may be reasonably included within their scope.

I claim:

1. In combination with a tractor having a draw bar and a tongued implement having a control lever, a means for horizontally hingedly connecting the end of the tongue of the implement to the draw bar of the tractor, a bar horizontally pivoted at its forward inner end on the forward end portion of said implement tongue and extending rearwardly and outwardly to the left of its connection with said tongue, a link connecting the outer end of said bar to said control lever, a second bar horizontally pivoted at its forward inner end on the forward end portion of said implement tongue and extending rearwardly and outwardly to the right of its connection with said tongue, a link connecting the outer end of said second bar to said control lever, and two oppositely extending horizontal wing members on said draw bar, forwardly adjacent of and in the same horizontal plane as said first and second pivoted bars respectively.

2. In combination with a tractor having a draw bar and a tongued implement having a control lever, a means for horizontally hingedly connecting the end of the tongue of the implement to the draw bar of the tractor, a bar horizontally pivoted at its forward inner end on the forward end portion of said implement tongue and extending rearwardly and outwardly to the left of its connection with said tongue, a link connecting the outer end of said bar to said control lever, a wing member on said draw bar capable of engaging said pivoted bar and forcing it rearwardly when said tractor turns in one direction, and a manually operated handle means connected to said lever and extending to the area of the forward end of said implement tongue.

3. In combination with a tractor having a draw bar and a tongued implement having a control lever, a means for horizontally hingedly connecting the end of the tongue of the implement to the draw bar of the tractor, a bar horizontally pivoted at its forward inner end on the forward end portion of said implement tongue and extending rearwardly and outwardly to the left of its connection with said tongue, a link connecting the outer end of said bar to said control lever, a second bar horizontally pivoted at its forward inner end on the forward end portion of said implement tongue and extending rearwardly and outwardly to the right of its connection with said tongue, a link connecting the outer end of said second bar to said control lever, two oppositely extending horizontal wing members on said draw bar, forwardly adjacent of and in the same horizontal plane as said first and second pivoted bars respectively, and a manually operated handle means connected to said lever and extending to the area of the forward end of said implement tongue.

RAYMOND W. KURTZ.

REFERENCES CITED

The following references are of record in the file of this patent:

UNITED STATES PATENTS

| Number | Name | Date |
|---|---|---|
| 1,780,955 | Toth | Nov. 11, 1930 |
| 2,297,788 | McGehee | Oct. 6, 1942 |

FOREIGN PATENTS

| Number | Country | Date |
|---|---|---|
| 12,190/28 | Australia | Dec. 18, 1928 |
| 22,199/35 | Australia | May 11, 1936 |